United States Patent
Schmaunz-Hirsch et al.

(10) Patent No.: US 10,975,231 B2
(45) Date of Patent: *Apr. 13, 2021

(54) SULFUR-CROSSLINKABLE RUBBER MIXTURE AND VEHICLE TIRE

(71) Applicant: Evonik Operations GmbH, Essen (DE)

(72) Inventors: Cornelia Schmaunz-Hirsch, Wunstorf (DE); Julia Schoeffel, Hannover (DE); Carla Recker, Hannover (DE); Kirsten Schwekendiek, Wunstorf (DE); Thomas Kramer, Herford (DE); Katharina Herzog, Harsum (DE)

(73) Assignee: Evonik Operations GmbH, Essen (DE)

( * ) Notice: Subject to any disclaimer, the term of this patent is extended or adjusted under 35 U.S.C. 154(b) by 88 days.

This patent is subject to a terminal disclaimer.

(21) Appl. No.: 16/312,415

(22) PCT Filed: Jun. 23, 2017

(86) PCT No.: PCT/EP2017/065499
§ 371 (c)(1),
(2) Date: Dec. 21, 2018

(87) PCT Pub. No.: WO2017/220764
PCT Pub. Date: Dec. 28, 2017

(65) Prior Publication Data
US 2019/0241721 A1    Aug. 8, 2019

(30) Foreign Application Priority Data

Jun. 24, 2016  (DE) .................. 10 2016 211 368.2

(51) Int. Cl.
| | |
|---|---|
| C08L 7/00 | (2006.01) |
| C08L 9/00 | (2006.01) |
| C08K 3/36 | (2006.01) |
| C08K 5/548 | (2006.01) |
| B60C 1/00 | (2006.01) |
| B29B 7/74 | (2006.01) |

(52) U.S. Cl.
CPC .............. *C08L 7/00* (2013.01); *B29B 7/7495* (2013.01); *B60C 1/00* (2013.01); *B60C 1/0041* (2013.01); *C08K 3/36* (2013.01); *C08K 5/548* (2013.01); *C08L 9/00* (2013.01); *B60C 2001/005* (2013.01); *B60C 2001/0058* (2013.01); *B60C 2001/0066* (2013.01); *B60C 2001/0075* (2013.01); *C08L 2312/00* (2013.01)

(58) Field of Classification Search
CPC .... C08L 7/00; C08L 9/00; C08K 3/36; C08K 5/548; B60C 1/0041; B60C 2001/005; B60C 2001/0058; B60C 2001/0066; B60C 2001/0075
See application file for complete search history.

(56) References Cited

U.S. PATENT DOCUMENTS

| | | | | |
|---|---|---|---|---|
| 7,307,116 | B2 * | 12/2007 | Mizuno ................. | B60C 1/00 152/537 |
| 10,214,635 | B2 * | 2/2019 | Schwekendiek ......... | C08K 3/36 |
| 2015/0329571 | A1 | 11/2015 | Moser et al. | |
| 2015/0329572 | A1 | 11/2015 | Moser et al. | |
| 2015/0329573 | A1 | 11/2015 | Moser et al. | |
| 2017/0073508 | A1 | 3/2017 | Schwekendiek et al. | |

FOREIGN PATENT DOCUMENTS

| | | |
|---|---|---|
| CN | 103781637 A | 5/2014 |
| DE | 102007057955 A1 * | 6/2009 |
| DE | 10 2014 202 748 A1 | 8/2015 |
| DE | 10 2014 209 239 A1 | 11/2015 |
| EP | 2 944 640 A1 | 11/2015 |
| EP | 2 944 641 A1 | 11/2015 |
| JP | 2002201312 A * | 7/2002 |
| WO | WO 2015/172915 A1 | 11/2015 |
| WO | WO-2015172915 A1 * | 11/2015 |

OTHER PUBLICATIONS

The machine translation into English of JP-2002-201312 A1; Kawamo et al; Jul. 2002.*
International Search Report dated Sep. 20, 2017 in PCT/EP2017/065499 filed on Jun. 23, 2017.

* cited by examiner

*Primary Examiner* — Karuna P Reddy
(74) *Attorney, Agent, or Firm* — Oblon, McClelland, Maier & Neustadt, L.L.P.

(57) ABSTRACT

The invention relates to a sulfur-crosslinkable rubber mixture, in particular for rubber-coating reinforcements in elastomer products, especially in vehicle tires, or inner components of vehicle tires, as well as to a vehicle tire. The rubber mixture comprises a diene rubber, an adhesive system, 10 to 200 phr silica, and 2 to 20 phr of a silane of the formula $[(R^1)_3Si-X]_mS_n(R^2)_{2-m}$, where residues $R^1$ are identical or different alkoxy groups, cyclic dialkoxy groups, cycloalkoxy groups, phenoxy groups, aryl groups, alkyl groups, alkenyl groups, aralkyl groups, or halides, and where X is a polar organic group containing urea, m represents the value 1 or 2, n is an integer between 1 and 8, and $R^2$ is a hydrogen atom or an acyl group comprising 1 to 20 carbon atoms.

11 Claims, No Drawings

SULFUR-CROSSLINKABLE RUBBER MIXTURE AND VEHICLE TIRE

JOINT RESEARCH AGREEMENT

The subject matter claimed was made as a result of activities undertaken within the scope of a joint research agreement. The parties to the joint research agreement are Evonik Operations GmbH and Continental Reifen Deutschland GmbH.

The invention relates to a sulfur-crosslinkable rubber mixture, especially for the rubberization of strength members in elastomer products, especially in vehicle tires, or inner components of vehicle tires, and to a vehicle tire.

Many elastomer products, such as pneumatic vehicle tires, drive belts, conveyor belts or the like, have been reinforced with textile or metallic strength members, for example with brass-plated steel cord, in order to withstand high mechanical stresses. Pneumatic vehicle tires have brass-plated steel cord, for example, in the belt, optionally the belt bandage, in the bead core, in the bead reinforcement and optionally in the carcass. In order to assure the durability of the rubber-strength member bond, the embedding rubber mixture (rubberizing mixture) should exhibit good adhesion to the strength member, and the adhesion should not be impaired by aging and storage under moist conditions. In the case of other components within elastomeric products that are not in direct contact with strength members as well, particular examples in vehicle tires being undertreads, belt edge strips or bead strips, the blend systems cited at the outset are frequently used with a bonding system.

The vulcanizates should also have high dynamic and mechanical strength and a low tendency to cracking and crack growth. It has been found that, for example, thermal and mechanical stresses in elastomer products reinforced with strength elements lead to fractures and cracks in the rubberizing mixtures, which ultimately lead to reduced service life.

Rubber is bonded to textile strength members via impregnation (for example with resorcinol-formaldehyde resins in combination with rubber latices, RFL dip), by a direct method with bonding mixtures or via bonding solutions composed of unvulcanized rubber with polyisocyanates.

Rubber-metal adhesion can be positively influenced by addition of what are called reinforcer resins in the rubberizing mixture. Examples of known reinforcer resins include lignin, phenyl-formaldehyde resins with hardener, and polymer resins. An established method of improving rubber-metal adhesion is to use cobalt salts and/or a resorcinol-formaldehyde-silica system or a resorcinol-formaldehyde system as additions for the rubberizing mixtures. Rubberizing mixtures with cobalt salts and a resorcinol-formaldehyde-silica system are known, for example, from KGK Kautschuk Gummi Kunststoffe No. 5/99, p. 322-328, from GAK 8/1995, p. 536 and EP-A-1 260 384.

It is an object of the present invention to provide a sulfur-crosslinkable rubber mixture comprising a bonding system for the rubberizing of strength members in elastomer products, especially vehicle tires, or inner components of vehicle tires, which lead to improved service life in the elastomer products.

This object is achieved by a rubber mixture containing the following constituents:
at least one diene rubber and
at least one bonding system and
10 to 200 phr of at least one silica and
2 to 20 phr of at least one silane having the general empirical formula I) $[(R^1)_3Si-X]_mS_n(R^2)_{2-m}$ where the $R^1$ radicals within a molecule may be the same or different and are alkoxy groups having 1 to 10 carbon atoms or cyclic dialkoxy groups having 2 to 10 carbon atoms or cycloalkoxy groups having 4 to 10 carbon atoms or phenoxy groups or aryl groups having 6 to 20 carbon atoms or alkyl groups having 1 to 10 carbon atoms or alkenyl groups having 2 to 20 carbon atoms or aralkyl groups having 7 to 20 carbon atoms or halides, and where X is a polar organic urea-containing group and where m assumes the value of 1 or 2 and where n is an integer from 1 to 8 and where $R^2$ is a hydrogen atom or an acyl group having 1 to 20 carbon atoms.

Surprisingly, the rubber mixture, by comparison with the prior art, shows higher stiffness with virtually unchanged indicators for heat buildup. Vehicle tires that contain the rubber mixture of the invention in a strength member ply and/or another inner component show improved service life.

The unit phr (parts per hundred parts of rubber by weight) used in this document is the customary quantity unit for mixture recipes in the rubber industry. The dosage of the parts by weight of the individual substances in this document is based on 100 parts by weight of the total mass of all rubbers present in the mixture that are of high molecular weight and hence solid.

It is a further object of the present invention to provide a vehicle tire that features improved service life. This object is achieved in that the vehicle tire contains the rubber mixture of the invention as described above in at least one component. All the remarks made below with regard to the constituents of the rubber mixture are also applicable here to the vehicle tire of the invention.

Preferably, the component is a strength member ply, such as belt, belt bandage, bead core, bead reinforcement and/or carcass. The rubber mixture here is then the carcass rubberization and/or belt rubberization etc.

In addition, the rubber mixture of the invention is preferably used for other inner components of vehicle tires in which a bonding system is present, such as, in particular, undertreads, belt edge strips or bead strips.

It is a further object of the present invention to improve the service life of vehicle tires. This object is achieved in accordance with the invention by the use of the above-described rubber mixture with all the abovementioned embodiments and features in vehicle tires.

In the context of the present invention, vehicle tires are understood to mean all vehicle tires known to the person skilled in the art, such as, in particular, pneumatic vehicle tires and all-rubber tires, including tires for industrial and construction site vehicles, truck tires, car tires and bicycle and motorcycle tires.

A preferred embodiment of the invention concerns a pneumatic vehicle tire.

Components of vehicle tires that contain strengthening members, in the context of the invention, are especially the belt plies and the carcass ply, belt bandage, the bead core, the bead reinforcement. Other inner components that likewise include a bonding system may especially be a bandage, such as, in particular, the belt bandage, and/or an undertread and/or a bead strip.

There follows a more detailed description of the constituents of the sulfur-crosslinkable rubber mixture of the invention. All remarks are also applicable to the vehicle tire of the invention that includes the rubber mixture of the invention in at least one component.

According to the invention, the rubber mixture contains at least one diene rubber. Diene rubbers refer to rubbers that form through polymerization or copolymerization of dienes and/or cycloalkenes and thus include C=C double bonds either in the main chain or in the side groups.

The diene rubber here is selected from the group consisting of natural polyisoprene and/or synthetic polyisoprene and/or epoxidized polyisoprene and/or butadiene rubber and/or butadiene-isoprene rubber and/or solution-polymerized styrene-butadiene rubber and/or emulsion-polymerized styrene-butadiene rubber and/or styrene-isoprene rubber and/or liquid rubbers having a molecular weight $M_w$ of greater than 20 000 g/mol and/or halobutyl rubber and/or polynorbornene and/or isoprene-isobutylene copolymer and/or ethylene-propylene-diene rubber and/or nitrile rubber and/or chloroprene rubber and/or acrylate rubber and/or fluoro rubber and/or silicone rubber and/or polysulfide rubber and/or epichlorohydrin rubber and/or styrene-isoprene-butadiene terpolymer and/or hydrogenated acrylonitrile-butadiene rubber and/or hydrogenated styrene-butadiene rubber.

Nitrile rubber, hydrogenated acrylonitrile-butadiene rubber, chloroprene rubber, butyl rubber, halobutyl rubber or ethylene-propylene-diene rubber in particular are used in the production of industrial rubber articles, such as belts including drive belts and hoses and/or footwear soles.

Preferably, the diene rubber is selected from the group consisting of natural polyisoprene and/or synthetic polyisoprene and/or butadiene rubber and/or solution-polymerized styrene-butadiene rubber and/or emulsion-polymerized styrene-butadiene rubber.

In a preferred development of the invention, at least two different diene rubber types are used in the rubber mixture.

In a preferred embodiment of the invention, the rubber mixture of the invention contains 0 to 30 phr, preferably 5 to 30 phr, of at least one butadiene rubber and 70 to 100 phr, preferably 70 to 95 phr, of at least one natural and/or synthetic polyisoprene. A rubber mixture of this kind, especially as a rubberizing mixture for strength members, e.g. as belt rubberization and/or carcass rubberization of vehicle tires, exhibits good properties, for example with regard to processibility and/or heat buildup (rolling resistance) and/or friction properties.

The rubber mixture of the invention contains 10 to 200 phr, preferably 20 to 180 phr, more preferably 40 to 150 phr, even more preferably 40 to 100 phr, preferably again 40 to 80 phr, of at least one silica.

The silicas may be the silicas that are known to those skilled in the art and are suitable as a filler for tire rubber mixtures. However, it is particularly preferable when a finely divided, precipitated silica is used that has a nitrogen surface area (BET surface area) (to DIN ISO 9277 and DIN 66132) of 35 to 350 m²/g, preferably of 35 to 260 m²/g, more preferably of 70 to 235 m²/g and most preferably of 70 to 205 m²/g and a CTAB surface area (to ASTM D 3765) of 30 to 400 m²/g, preferably of 30 to 255 m²/g, more preferably of 65 to 230 m²/g and most preferably of 65 to 200 m²/g.

In rubber mixtures for inner tire components, for example, such silicas lead to particularly good physical properties of the vulcanizates. Advantages can also arise in the mixture processing through a reduction in the mixing time with the same product properties, which lead to improved productivity. As silicas it is thus possible, for example, those of the Ultrasil® VN3 type (trade name) from Evonik and also silicas having a comparatively low BET surface area (for example Zeosil® 1115 or Zeosil® 1085 from Solvay) and also finely divided silicas, called HD silicas (e.g. Zeosil® 1165 MP from Solvay).

It is essential to the invention that the rubber mixture contains a silane having the general empirical formula

$$[(R^1)_3Si-X]_m S_n (R^2)_{2-m} \quad \text{I)}$$

where the $R^1$ radicals within one molecule may be the same or different and are alkoxy groups having 1 to 10 carbon atoms or cyclic dialkoxy groups having 2 to 10 carbon atoms or cycloalkoxy groups having 4 to 10 carbon atoms or phenoxy groups or aryl groups having 6 to 20 carbon atoms or alkyl groups having 1 to 10 carbon atoms or alkenyl groups having 2 to 20 carbon atoms or are aralkyl groups having 7 to 20 carbon atoms or halides, and where X is a polar organic urea-containing group and where m assumes the value of 1 or 2 and where n is an integer from 1 to 8 and where $R^2$ is an acyl group having 1 to 20 carbon atoms or a hydrogen atom.

Cyclic dialkoxy groups are derivatives of diols.

This silane of formula I) in the rubber mixture of the invention serves a) as coupling agent for attachment of the silica present in the rubber mixture to the polymer chains of the diene rubber(s)

and/or b) for surface modification of silica by attachment to the silica particles without attachment to the polymer chains.

Silane coupling agents are common knowledge and react with the surface silanol groups of the silica or other polar groups during the mixing of the rubber or rubber mixture (in situ) or already prior to the addition of the filler to the rubber in the manner of a pretreatment (premodification). Some silanes can additionally bind to polymer chains of the rubber(s).

In the rubber mixture of the invention, the abovementioned silane wholly or partly replaces the silanes known in the prior art such as TESPD (3,3'-bis(triethoxysilylpropyl)disulfide) or TESPT (3,3'-bis(triethoxysilylpropyl)tetrasulfide) or octyltriethoxysilanes (e.g. Si208®, from Evonik) or mercaptosilanes, such as 3-mercaptopropyltriethoxysilane (e.g. Si263®, from Evonik), or blocked mercaptosilanes, such as 3-octanoylthio-1-propyltriethoxysilane (e.g. NXT silane, from Momentive), with a simultaneous increase in stiffness without showing the disadvantages with regard to rolling resistance characteristics.

It is also conceivable in the context of the present invention that the abovementioned silane having the general empirical formula I) is used in combination with one or more silanes from the prior art.

The silane having the general empirical formula I) is present in the rubber mixture of the invention in amounts of 2 to 20 phr, preferably 2 to 15 phr, more preferably 5 to 15 phr.

It is essential to the invention that the silane having the abovementioned empirical formula I) has a polar organic urea-containing X group. This polar urea-containing X group joins the silicon atom(s) to a sulfur atom in the $S_n$ moiety.

In the art, such a linking group is also called "spacer" since it determines the spacing between silicon (attachment to the filler) and sulfur (attachment to the diene rubber).

The organic spacers known in the art typically contain one or more propyl radicals (also called a propyl group) as customary, for example, in the above-detailed silanes TESPD and TESPT and mercaptosilanes and NXT silanes.

With the rubber mixture of the invention, it has been found that, using a silane with a polar urea-containing spacer X rather than a silane from the prior art, in combination with a bonding system, elevated stiffness of the rubber mixture is achieved with simultaneously very good indicators for heat buildup. Particularly when used as rubberizing mixture for strength members or other inner components of vehicle tires, this achieves elevated service life.

"Polar organic urea-containing X group" is understood here to mean that this is an unbranched, branched or cyclic hydrocarbyl group that has at least one polar organic urea functionality.

The heteroatoms of the at least one urea functionality, such as oxygen (O), nitrogen (N), by comparison with hydrocarbyl radicals without heteroatoms, such as alkyl groups, result in a greater polarity within the molecule, which give rise to the term "polar" in the context of the present invention. Hydrocarbyl radicals without heteroatoms are generally classified as nonpolar in the art.

The expression "polar" should be regarded as an additional description of the X group, the feature essential to the invention being "urea-containing".

The above description of the polar organic urea-containing functionalities should be understood such that the at least one urea functionality bound within the hydrocarbon-containing radical is present in the form of the urea derivative by virtue of the attachment to the hydrocarbon-containing radical, and so the polar organic group has at least one following polar functionality:

—(H)N—CO—N(H)—                                    II)

Thus, the group II) is joined to the $S_n$ group on one side directly or via R radicals (organic hydrocarbyl group as described below) and to the silicon atom of the $(R^1)_3Si$ group on the other side directly or via R radicals (organic hydrocarbyl group as described below). The R radicals may be the same or different on either side.

In a preferred embodiment of the invention, the polar organic urea-containing X group has at least one urea derivative of formula II) as polar functionality that bears, on the two nitrogen atoms, an organic hydrocarbyl group R having 1 to 30 carbon atoms, preferably 1 to 20 carbon atoms, more preferably 1 to 10 carbon atoms, even more preferably 1 to 7 carbon atoms, especially preferably 2 or 3 carbon atoms, where the group between one nitrogen atom of the urea-containing group and the sulfur of the $S_n$ group is aliphatic, preferably an alkyl group, and the group between the second nitrogen atom of the urea-containing group and the silicon atom of the $(R^1)_3Si$ group may be either aliphatic or aromatic. The R radicals may thus be the same or different on either side.

In a further preferred embodiment of the invention, the polar organic urea-containing X group has at least one urea derivative of formula II) as a polar functionality that bears an organic hydrocarbyl group on the two nitrogen atoms, where the group (organic hydrocarbyl group) between one nitrogen atom of the urea-containing group and the sulfur of the $S_n$ group is aliphatic, more preferably an alkyl group, and the group between the second nitrogen atom of the urea-containing group and the silicon atom of the $(R^1)_3Si$ group is aliphatic, more preferably an alkyl group.

More preferably, the nitrogen atom and the silicon atom of the $(R^1)_3Si$ group are thus bonded to one another by an alkyl group, and the other nitrogen atom and the sulfur atom of the $S_n$ group likewise via an alkyl group. In this case, the two groups may be the same alkyl radical or different alkyl radicals (e.g. different number of carbon atoms).

In this way, by comparison with the prior art, particularly high stiffnesses and tensile strengths and/or even improved rolling resistance indicators of the rubber mixture are achieved. The state of the art here is JP2002201312A, in which agents having aromatic spacers containing a nitrogen-containing organic functionality are disclosed, these having lower stiffnesses and lower tensile strengths compared to other silanes.

According to Römpp's Online Lexicon, version 4.0, "aliphatic compounds" are "functionalized or unfunctionalized organic compounds that do not contain an aromatic ring system".

In a preferred embodiment of the invention, X is a 1-ethyl-3-propylurea radical. In the context of the present invention, the propyl group here is arranged between the first nitrogen atom of the urea functionality and the silicon atom, and the ethyl group between the second nitrogen atom of the urea functionality and the sulfur atom of the $S_n$ group. This is preferably applicable to all embodiments of the present invention.

However, for the achievement of the underlying technical object, it is also conceivable in principle that the ethyl and propyl radicals are arranged the other way round between urea and Si and between urea and sulfur atom respectively.

As well as at least one urea functionality as described above, the X group may also be substituted by F—, Cl—, Br—, I—, CN— or HS— on the organic hydrocarbyl groups (R radicals) as described above.

The $R^1$ radicals bonded to the silicon atom are alkoxy groups having 1 to 10 carbon atoms, preferably methoxy or ethoxy groups, or cyclic dialkoxy groups having 2 to 10 carbon atoms or cycloalkoxy groups having 4 to 10 carbon atoms or phenoxy groups or aryl groups having 6 to 20 carbon atoms, preferably phenyl, or alkyl groups having 1 to 10 carbon atoms, preferably methyl or ethyl groups, or alkenyl groups having 2 to 20 carbon atoms or aralkyl groups having 7 to 20 carbon atoms or halides, preferably chlorides (R'=Cl), and may be the same or different within one molecule.

It is also conceivable here that a cyclic dialkoxy group (the derivative of a diol) is attached such that it is bonded to the silicon atom by both oxygen atoms and hence counts as two attached $R^1$ radicals, where the further $R^1$ radical is selected from the abovementioned options.

Preferably, however, $R^1$ is methoxy and/or ethoxy groups. More preferably, all three $R^1$ radicals are the same and are methoxy and/or ethoxy groups and most preferably three ethoxy groups.

The index m may assume the values of 1 or 2. Thus, the group

$[(R^1)_3Si—X]$                                    III)

may be present once or twice per molecule. In the case that m=2, the sulfur is thus bonded solely to two of these groups, and so there is no $R^2$ radical present in the molecule in this case. The two groups III) are then joined via the moiety $S_n$ with n=1 to 8, i.e. via one sulfur atom or a chain of 2 to 8 sulfur atoms.

Preferably, n is an integer from 1.4 to 6, more preferably from 1.6 to 4. This results in particularly good properties with regard to stiffness and vulcanization characteristics, especially full vulcanization time.

The sulfur content (n value) is determined by means of $^1H$ NMR.

If m=1, one $R^2$ radical is bonded to the sulfur atom furthest removed from the silyl group. $R^2$ is a hydrogen atom or an acyl group having 1 to 20 carbon atoms. If the $R^2$ radical is an acyl group, the carbon atom that bears the keto group, i.e. the double bond to the oxygen atom, is preferably bonded to the sulfur atom furthest removed from the silyl group.

In a preferred embodiment, the acyl group is an acetyl radical, i.e. the —CO—CH$_3$ moiety.

In the context of the present invention, silyl group is understood to mean the moiety $$(R^1)_3Si—. \quad \text{IV)}$$

The silane may be either a mercaptosilane or a protected mercaptosilane, also called blocked mercaptosilane.

In a preferred embodiment of the invention, the rubber mixture of the invention contains a silane having the following structure:

$$[(R^1)_3Si—X]_2S_n \quad \text{V)}$$

In the abovementioned empirical formula I), m is thus 2, and so the $S_n$ moiety is joined on either side to a moiety $$[(R^1)_3Si—X]. \quad \text{III)}$$

More preferably, the polar urea-containing X groups and the $R^1$ radicals are the same on either side of the molecule.

In this case, $R^1$ is more preferably an ethoxy group, which is then present a total of six times in the molecule.

Preferably, X on either side is a 1-ethyl-3-propylurea radical.

In a preferred embodiment, m=2 and n is 1.8 to 2.3, such that there is a mixture of silanes with different chains on sulfur atoms. Preferably, the disilane with n=2 is present in this mixture to an extent of more than 50% by weight, preferably 70% to 100% by weight. The silane present with preference thus has the following structure VI):

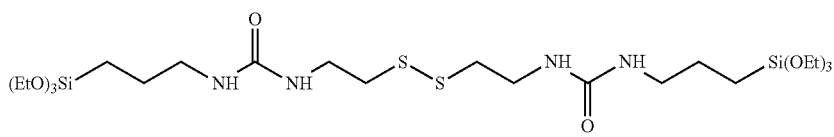

In this structure, a sulfur atom is bonded to each of the ethyl groups of the two 1-ethyl-3-propylurea radicals.

This silane achieves particularly good stiffnesses with the same heat buildup.

This silane can be obtained, for example, by reaction of cystamine dihydrochloride with 3-isocyanatopropyltriethoxysilane in water with addition of at least one base, for example a 50% KOH solution (KOH=potassium hydroxide).

The described silanes of the embodiments of formula I) are analyzed by means of $^{13}$C NMR, $^1$H NMR and $^{29}$Si NMR.

In a further preferred embodiment, m=2 and n is an integer from 2 to 8, more preferably 3 or 4, where all other radicals are preferably as set out in formula VI).

In this case, the rubber mixture of the invention may also contain a mixture of silane molecules with different values of n. For example, the rubber mixture (analogously to the above remarks) may have a mixture of the silanes with n=2 and/or n=3 and n=4.

Such a silane with a 64 mol % $S_4$ content (with <5 mol % of $S_x$ where x in this case is >4) and a 36 mol % $S_4$ content can be obtained, for example, by reaction of 3-aminopropyltriethoxysilane with 2-chloroethyl isocyanate in ethanol and subsequent reaction with sodium polysulfide ($Na_2S_4$).

In a further preferred embodiment of the invention, n=1 and in =2, giving a monosulfane silane.

All other radicals are preferably as set out in formula VI), i.e. $R^1$=ethoxy (EtO) and X=1-ethyl-3-propylurea radical.

This silane can be obtained by reaction of 3-aminopropyltriethoxysilane with 2-chloroethyl isocyanate in ethanol and subsequent reaction with sodium sulfide ($Na_2S$). Surprisingly, even with a monosulfane (with n=1 and m=2), by comparison with a prior art silane that does not bind to polymers, an increase in stiffness is found with the same or even improved indicators for rolling resistance.

In a further embodiment, the silane of formula I) is a mercaptosilane. In this case, m=1, and $R^2$=H, and n=1.

Here too, X is preferably a 1-ethyl-3-propylurea radical, where the propyl group is present between the first nitrogen atom of the urea functionality and the silicon atom, and the ethyl group between the second nitrogen atom of the urea functionality and the sulfur atom. This silane can be obtained by reaction of NaSH in ethanol (by introduction of H$_2$S into a sodium ethoxide solution prepared from sodium and ethanol) with the halosilane (EtO)$_3$Si—CH$_2$CH$_2$CH$_2$—NH—CO—NH—CH$_2$CH$_2$—Cl in ethanol.

In a further embodiment, the silane of formula I) is a blocked mercaptosilane. In this case, m=1, and $R^2$=an acyl group having 1 to 20 carbon atoms (alkanoyl radical), preferably an acetyl radical (—CO—CH$_3$), and n=1.

Here too, X is preferably a 1-ethyl-3-propylurea radical, where the propyl group is present between the first nitrogen atom of the urea functionality and the silicon atom, and the ethyl group between the second nitrogen atom of the urea functionality and the sulfur atom. This silane can be obtained by reaction of 3-aminopropyltriethoxysilane with 2-chloroethyl isocyanate in ethanol and subsequent reaction with potassium thioacetate.

The rubber mixture of the invention may contain, as well as silica, further known polar and/or nonpolar fillers, for example carbon black.

If the rubber mixture of the invention contains carbon black, preference is given to using a carbon black having an iodine adsorption number to ASTM D 1510 of 30 to 250 g/kg, preferably 30 to 180 g/kg, more preferably 40 to 180 g/kg, and most preferably 40 to 130 g/kg, and a DBP number to ASTM D 2414 of 60 to 200 mL/100 g, preferably 70 to 200 mL/100 g, more preferably 90 to 150 mL/100 g.

The amount of carbon black in the rubber mixture of the invention is preferably 0 to 50 phr, more preferably 0 to 20 phr and most preferably 0 to 7 phr, but in a preferred embodiment at least 0.1 phr.

In a particularly preferred embodiment of the invention, the rubber mixture contains 0.1 to 7 phr carbon black.

In a further preferred embodiment of the invention, the rubber mixture contains 0 to 0.5 phr carbon black.

It is also conceivable that the rubber mixture contains carbon nanotubes (CNTs), including discrete CNTs, hollow carbon fibers (HCFs) and modified CNTs containing one or more functional groups, such as hydroxyl, carboxyl and carbonyl groups.

Also conceivable as filler are graphite and graphenes, and "carbon-silica dual-phase filler". The rubber mixture may also contain other polar fillers, for example aluminosilicates, chalk, starch, magnesium oxide, titanium dioxide or rubber gels.

The rubber mixture of the invention contains at least one bonding system.

According to whether the rubber mixture is to be used for rubberization for textile or metal strength members, either a bonding system for rubber-textile adhesion or a bonding system for rubber-metal adhesion is employed. The same applies to the inner components that do not have any strength members but are arranged adjacent to a component with textile or metallic strength members in the tire. An inner component such as the belt cushion of a truck or car tire is adjacent, for example, to the belt ply that contains steel; the belt cushion in that case preferably likewise includes a bonding system for rubber-metal adhesion, i.e. as in the belt rubberization.

Analogously, an inner component adjacent to the carcass ply of a car tire with textile strength members preferably contains a bonding system for rubber-textile adhesion, i.e. as in the carcass rubberization.

In a further development of the invention, the strength members are metallic strength members. The improvement in adhesion and cracking characteristics has a particularly advantageous effect in metallic strength members since these are exposed to an increased level of corrosion in the event of loss of adhesion and cracking, which greatly impairs the lifetime of the elastomer products, especially pneumatic vehicle tires.

If the rubber mixture is used for rubberization of metallic strength members, especially steel cord, preference is given to using a steel cord bonding system based on organic cobalt salts and reinforcer resins and more than 2.5 phr sulfur.

The organic cobalt salts are typically used in amounts of 0.2 to 2 phr. Cobalt salts used may, for example, be cobalt stearate, borate, borate alkanoates, naphthenate, rhodinate, octoate, adipate etc. Reinforcer resins used maybe resorcinol-formaldehyde resins, for example resorcinol-hexamethoxymethylmelamine resins (HMMM) or resorcinol-hexamethylenetetramine resins (HEXA), or modified phenol resins, for example Alnovol® products. It is also possible to use the precondensates of the resorcinol resins.

It is possible for the rubber mixture to include 0 to 100 phr, preferably 0.1 to 80 phr, more preferably 0.1 to 70 phr and most preferably 0.1 to 50 phr of at least one plasticizer. These include all plasticizers known to the person skilled in the art, such as aromatic, naphthenic or paraffinic mineral oil plasticizers, for example MES (mild extraction solvate) or TDAE (treated distillate aromatic extract), or rubber-to-liquid (RTL) oils or biomass-to-liquid (BTL) oils or factices or plasticizer resins or liquid polymers (such as liquid BR), the average molecular weight of which (determination by GPC=gel permeation chromatography, in accordance with BS ISO 11344:2004) is between 500 and 20 000 g/mol. If liquid polymers are used as plasticizers in the rubber mixture of the invention, these are not included as rubber in the calculation of the composition of the polymer matrix.

The plasticizer is preferably selected from the group consisting of the abovementioned plasticizers.

Mineral oils are particularly preferred as plasticizer.

When mineral oil is used, it is preferably selected from the group consisting of DAE (distilled aromatic extracts) and/or RAE (residual aromatic extracts) and/or TDAE (treated distilled aromatic extracts) and/or IVIES (mild extracted solvents) and/or naphthenic oils.

Furthermore, the rubber mixture of the invention may comprise standard additives in customary proportions by weight. These additives include a) anti-aging additives, for example N-phenyl-N'-(1,3-dimethylbutyl)-p-phenylenediamine (6PPD), N,N'-diphenyl-p-phenylenediamine (DPPD), N,N'-ditolyl-p-phenylenediamine (DTPD), N-isopropyl-N'-phenyl-p-phenylenediamine (IPPD), 2,2,4-trimethyl-1,2-dihydroquinoline (TMQ), b) activators, for example zinc oxide and fatty acids (e.g. stearic acid), c) waxes, d) mastication aids, for example 2,2'-dibenzamidodiphenyl disulfide (DBD), and e) processing aids, for example fatty acid salts, for example zinc soaps, and fatty acid esters and derivatives thereof.

The proportion of the total amount of further additives is 3 to 150 phr, preferably 3 to 100 phr and more preferably 5 to 80 phr.

The total proportion of the further additives also includes 0.1 to 10 phr, preferably 0.2 to 8 phr, more preferably 0.2 to 4 phr, of zinc oxide (ZnO).

This may be selected from all types of zinc oxide known to those skilled in the art, for example ZnO granules or powder. The conventionally used zinc oxide generally has a BET surface area of less than 10 $m^2/g$. However, it is also possible to use what is called nano-zinc oxide having a BET surface area of 10 to 60 $m^2/g$.

It is customary to add zinc oxide as activator, usually in combination with fatty acids (e.g. stearic acid), to a rubber mixture for sulfur crosslinking with vulcanization accelerators. The sulfur is then activated by complex formation for the vulcanization.

The vulcanization is conducted in the presence of sulfur or sulfur donors with the aid of vulcanization accelerators, it being possible for some vulcanization accelerators to act simultaneously as sulfur donors. Sulfur or sulfur donors and one or more accelerators are added in the stated amounts to the rubber mixture in the last mixing step. The accelerator is selected from the group consisting of thiazole accelerators and/or mercapto accelerators and/or sulfenamide accelerators and/or thiocarbamate accelerators and/or thiuram accelerators and/or thiophosphate accelerators and/or thiourea accelerators and/or xanthate accelerators and/or guanidine accelerators.

Preference is given to using a sulfenamide accelerator selected from the group consisting of N-cyclohexyl-2-benzothiazolesulfenamide (CBS) and/or N,N-dicyclohexylbenzothiazole-2-sulfenamide (DCBS) and/or benzothiazyl-2-sulfenomorpholide (MBS) and/or N-tert-butyl-2-benzothiazylsulfenamide (TBBS)

Sulfur-donating substances used may be any of the sulfur-donating substances known to those skilled in the art. If the rubber mixture contains a sulfur-donating substance, it is preferably selected from the group comprising, for example, thiuram disulfides, for example tetrabenzylthiuram disulfide (TBzTD) and/or tetramethylthiuram disulfide (TMTD) and/or tetraethylthiuram disulfide (TETD), and/or thiuram tetrasulfides, for example dipentamethylenethiuram tetrasulfide (DPTT), and/or dithiophosphates, for example DipDis (bis(diisopropyl)thiophosphoryldisulfide) and/or bis(O,O-2-ethylhexylthiophosphoryl)polysulfide (e.g. Rhenocure SDT 50®, Rheinchemie GmbH) and/or zinc dichloryldithiophosphate (e.g. Rhenocure ZDT/S®, Rheinchemie GmbH) and/ or zinc alkyldithiophosphate, and/or 1,6-bis(N,N-dibenzyl-thiocarbamoyldithio)hexane and/or diarylpolysulfides and/or dialkylpolysulfides.

The rubber mixture of the invention is produced by processes which are customary in the rubber industry and in which a base mixture comprising all constituents apart from constituents of the vulcanization system, such as sulfur and vulcanization accelerators, is firstly produced in one or more mixing stages. The finished mixture is produced by adding the vulcanization system in a final mixing stage. The finished mixture is processed further, for example, by an extrusion operation and converted to the appropriate shape.

Preferably, the rubber mixture of the invention is used as rubberizing mixture for strength members in one or more strength member plies of vehicle tires, for example as carcass rubberization and/or belt rubberization and/or rubberization of the belt bandage and/or rubberization in the bead core and/or bead reinforcement.

In addition, the rubber mixture of the invention is preferably used in an inner tire component where adhesion to the surrounding components is likewise of relevance to the service life of the tire, especially in driving operation, such as preferably undertreads, belt edge strips and/or bead strips.

The rubber mixture is also suitable for production of industrial rubber articles, for example belts including conveyor belts and breaker belts, hoses, pressure pads, air springs or damping elements, or footwear soles.

The invention is now to be elucidated in detail with reference to comparative and working examples summarized in table 1.

The comparative mixtures are identified by V, the inventive mixtures by E.

The mixture was produced by the method customary in the rubber industry under customary conditions in two stages in a laboratory mixer of capacity 300 milliliters to 3 liters, by first mixing, in the first mixing stage (base mixing stage), all the constituents except for the vulcanization system (sulfur and vulcanization-influencing substances) at 145 to 165° C., target temperatures of 152 to 157° C., for 200 to 600 seconds. Addition of the vulcanization system in the second stage (final mixing stage) produced the final mixture, with mixing at 90° C. to 120° C. for 180 to 300 seconds.

The general process for producing rubber mixtures and vulcanizates thereof is described in "Rubber Technology Handbook", W. Hofmann, Hanser Verlag 1994.

All mixtures were used to produce test specimens by vulcanization after $t_{95}$ (measured on a Moving Disc Rheometer according to ASTM D 5289-12/ISO 6502) under pressure at 160° C., and these test specimens were used to determine material properties typical for the rubber industry by the test methods specified hereinafter.

Shore A hardness at room temperature (RT) to DIN ISO 7619-1
Resilience at RT to DIN 53 512
Dynamic storage modulus E' at 55° C. to ISO 4664-1 at 0.15% elongation and at 8% elongation Loss factor tan d, synonymous to tan δ, from dynamic-mechanical measurement, temperature sweep; calculation of dynamic modulus $E^*_{corr}$ to DIN53513 (1978), conditioning: 20%+/−14%, frequency 10 Hz, temperature range −80° C.--100° C., heating rate 1.6 K/min, static prestrain 10%, dynamic strain 0.2%

Tensile strength and stress value at 100% (100 modulus, M100) and 300% static strain (300 modulus, M300) at room temperature to DIN 53 504

Substances Used
a) BR: polybutadiene, high-cis Nd—BR, unfunctionalized, $T_g$=−105° C., BUNA® CB25, from Lanxess
b) silica: Hi-Sil™ 160 G, PPG Silica Products
c) TESPT silane, 50% on carbon black
d) silane of structure VI) with polar organic urea-containing spacer:

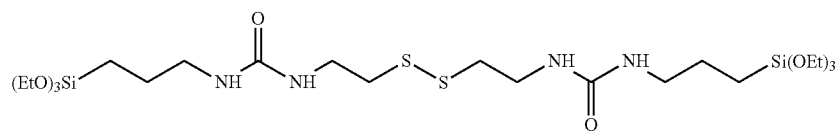

VI)

Here, in formula VI): n=2; $R^1$=(EtO); X=1-ethyl-3-propylurea; m=2;
prepared by process E) specified below Preparation of the Silane Preparation of the silane of formula VI) [(EtO)$_3$Si—(CH$_2$)$_3$—NH—C(=O)—NH—(CH$_2$)$_2$—S—]$_2$ in water (without hexane wash):

An N$_2$-purged 1 L jacketed four-neck flask with precision glass stirrer, reflux condenser, internal thermometer and dropping funnel is initially charged with cystamine dihydrochloride (108.39 g, 0.47 mol, 1.00 eq) which was dissolved in demineralized water (382 ml). By means of a dropping funnel, 50% KOH solution (92.31 g, 0.82 mol, 1.75 eq) is metered in at 15-23° C. and the mixture is stirred for 30 min. Then 3-isocyanatopropyltriethoxysilane (221.05 g, 0.85 mol, 1.8 eq) is metered in at such a rate that an internal temperature of 30° C. is not exceeded. Thereafter, the mixture is stirred at 24° C. for one hour. The white suspension is filtered under pressure, rinsed with three portions of demineralized water (340 ml in total) and dried with dry N$_2$ for 2 h. The filtercake is dried in an N$_2$ stream in a rotary evaporator at 35° C. and 166 mbar for 7 h, at 35° C. and 150 mbar for 10 h and at 35° C. and 100 mbar for 9 h.

The [(EtO)$_3$Si—(CH$_2$)$_3$—NH—C(=O)—NH—(CH$_2$)$_2$—S—]$_2$ product is a fine white powder (246.38 g, 90.7% of theory; theory corresponds to maximum possible yield);

$^1$H NMR ($\beta_{ppm}$, 500 MHz, DMSO-d6): 0.52 (4H, t), 1.14 (18H, t), 1.42 (4H, m), 2.74 (4H, m), 2.96 (4H, m), 3.29 (4H, m), 3.74 (12H, q), 6.05 (4H, m);

$^{13}$C NMR ($\delta_{ppm}$, 125 MHz, DMSO-d6): 7.3 (2C), 18.2 (6C), 23.5 (2C), 38.5 (2C), 39.6 (2C), 42.0 (2C), 57.7 (6C) 157.9 (2C).

$^{29}$Si NMR ($\delta_{ppm}$, 100 MHz, DMSO-d6): −45.3 (100% silane);

Soluble fractions in d6-DMSO using TPPO internal standard: 86.0%;

Water content (DIN 51777): 0.7%;
Initial melting point: 97° C.;
Residual isocyanate content: 0.08%

As apparent from table 1 by the comparison of E1 vs. V1 (equimolar exchange of the silane), the rubber mixtures of the invention have distinctly higher stiffness, which is manifested in the elevated values of 100 modulus, 300 modulus, and E (at 0.15% strain) and E (at 8% strain). At the same time, the inventive rubber mixture E1 has a lower loss factor tan d, particularly at the temperatures such as 55° C. and 80° C. that are of relevance for heat buildup.

This gives rise to an improved service life of the tires for use of the rubber mixture of the invention in vehicle tires, especially in inner components of pneumatic vehicle tires.

TABLE 1

| Constituents | Unit | V1 | E1 |
|---|---|---|---|
| NR TSR | phr | 80 | 80 |
| BR [a)] | phr | 20 | 20 |
| Silica [b)] | phr | 60 | 60 |
| Silane [c)] | phr | 10.3 | — |
| Silane [d)] | phr | — | 6.2 |
| N339 carbon black | phr | — | 5.15 |
| Plasticizer & processing auxiliary | phr | 12 | 12 |
| Aging stabilizer | phr | 3.75 | 3.75 |
| Organic cobalt salt | phr | 0.36 | 0.36 |
| Resorcinol | phr | 2.5 | 2.5 |
| Resin of resorcinol and formaldehyde donor | phr | 3.85 | 3.85 |
| ZnO | phr | 8 | 8 |
| DCBS accelerator | phr | 1.5 | 1.5 |
| Sulfur | phr | 4.3 | 4.9 |
| Physical properties | | | |
| Shore hardness at RT | Shore A | 83 | 90 |
| Resilience at RT | % | 38 | 38 |
| Tensile strength | MPa | 20 | 18 |
| 100 modulus | MPa | 4.5 | 6.3 |
| 300 modulus | MPa | 14.6 | 17.6 |
| E' (0.15%) | MPa | 24 | 36 |
| E' (8%) | MPa | 10.5 | 15 |
| tan δ (−15° C.) | | 0.288 | 0.257 |
| tan δ (0° C.) | | 0.203 | 0.186 |
| tan δ (20° C.) | | 0.163 | 0.153 |

TABLE 1-continued

| Constituents | Unit | V1 | E1 |
|---|---|---|---|
| tan δ (55° C.) | | 0.12 | 0.113 |
| tan δ (80° C.) | | 0.096 | 0.094 |

The invention claimed is:

1. A sulfur-crosslinkable rubber mixture comprising:
at least one diene rubber;
at least one bonding system;
10 to 200 phr of at least one silica; and
2 to 20 phr of at least one silane having the general empirical formula $$[(R^1)_3Si—X]_mS_n(R^2)_{2-m} \quad \text{I)}$$

wherein the $R^1$ radicals within a molecule may be the same or different and are alkoxy groups having 1 to 10 carbon atoms or cyclic dialkoxy groups having 2 to 10 carbon atoms or cycloalkoxy groups having 4 to 10 carbon atoms or phenoxy groups or aryl groups having 6 to 20 carbon atoms or alkyl groups having 1 to 10 carbon atoms or alkenyl groups having 2 to 20 carbon atoms or aralkyl groups having 7 to 20 carbon atoms or halides, wherein X is a polar organic urea-containing group and where m assumes the value of 1 or 2 and where n is an integer from 1 to 8 and where $R^2$ is a hydrogen atom or an acyl group having 1 to 20 carbon atoms, wherein the polar organic urea-containing X group has at least one urea derivative as a polar functionality that bears an organic hydrocarbyl group on the two nitrogen atoms, and wherein the group between the first nitrogen atom of the urea-containing group and the sulfur of the $S_n$ group is aliphatic, and the group between the second nitrogen atom of the urea-containing group and the silicon atom of the $(R^1)_3Si$ group is aliphatic or aromatic.

2. The sulfur-crosslinkable rubber mixture of claim 1, wherein the polar organic urea-containing X group has at least one urea derivative as a polar functionality that bears an organic hydrocarbyl group on the two nitrogen atoms, where the group between the first nitrogen atom of the urea-containing group and the sulfur of the $S_n$ group is aliphatic and the group between the second nitrogen atom of the urea-containing group and the silicon atom of the $(R^1)_3Si$ group is aliphatic.

3. The sulfur-crosslinkable rubber mixture of claim 1, wherein the polar organic urea-containing X group is a 1-ethyl-3-propylurea radical.

4. The sulfur-crosslinkable rubber mixture of claim 1, wherein the silane is a mixture with n=1.8 to 2.3 and at least the silane of formula VI) is present in the silane mixture to an extent of more than 50% by weight:

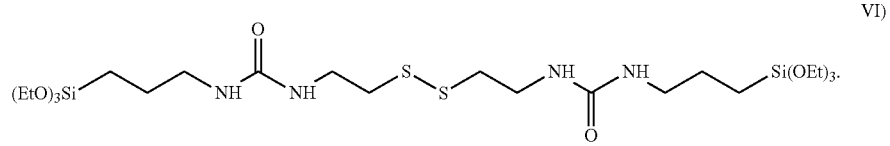

VI)

5. The sulfur-crosslinkable rubber mixture of claim 1, comprising 5 to 30 phr of at least one butadiene rubber and 70 to 95 phr of at least one natural and/or synthetic polyisoprene.

6. The sulfur-crosslinkable rubber mixture of claim 1, comprising 40 to 80 phr of silica.

7. A vehicle tire, comprising the sulfur-crosslinkable rubber mixture of claim 1 in at least one component.

8. The vehicle tire of claim 7, wherein the component is a strength member ply.

9. The vehicle tire of claim 8, wherein the strength members are metallic strength members.

10. The vehicle tire of claim 9, wherein the bonding system is a steel cord bonding system based on organic cobalt salts and reinforcer resins and more than 2.5 phr sulfur.

11. The vehicle tire of claim 7, wherein the component is an inner component.

* * * * *